United States Patent
Jobi et al.

(10) Patent No.: US 10,303,499 B2
(45) Date of Patent: May 28, 2019

(54) APPLICATION AWARE GRAPH DRIVER

(71) Applicant: Portworx, Inc., Los Altos, CA (US)

(72) Inventors: Joseph Jobi, Santa Clara, CA (US); Goutham Rao, Los Altos, CA (US)

(73) Assignee: Portworx, Inc., Los Altos, CA (US)

(*) Notice: Subject to any disclaimer, the term of this patent is extended or adjusted under 35 U.S.C. 154(b) by 17 days.

(21) Appl. No.: 15/488,300

(22) Filed: Apr. 14, 2017

(65) Prior Publication Data

US 2018/0189122 A1    Jul. 5, 2018

Related U.S. Application Data

(60) Provisional application No. 62/442,817, filed on Jan. 5, 2017, provisional application No. 62/445,623, filed on Jan. 12, 2017.

(51) Int. Cl.
*G06F 9/30* (2018.01)
*G06F 9/455* (2018.01)

(52) U.S. Cl.
CPC .................... *G06F 9/455* (2013.01)

(58) Field of Classification Search
CPC ..... G06F 17/30091; G06F 9/546; G06F 9/545
See application file for complete search history.

(56) References Cited

U.S. PATENT DOCUMENTS

| | | | |
|---|---|---|---|
| 5,758,347 A | 5/1998 | Lo et al. | |
| 6,996,570 B2 | 2/2006 | Noble et al. | |
| 7,401,338 B1 | 7/2008 | Bowen et al. | |
| 2007/0136601 A1 | 6/2007 | Kwon et al. | |
| 2010/0262752 A1 | 10/2010 | Davis et al. | |
| 2011/0270833 A1* | 11/2011 | von Kaenel | G06F 17/30241 707/736 |
| 2013/0212161 A1* | 8/2013 | Ben-Shaul | G06F 9/4451 709/203 |
| 2014/0053150 A1 | 2/2014 | Barnett et al. | |
| 2016/0359955 A1* | 12/2016 | Gill | H04L 67/1097 |
| 2018/0144014 A1 | 5/2018 | Mittal et al. | |
| 2018/0189121 A1 | 7/2018 | Jobi et al. | |
| 2018/0189176 A1 | 7/2018 | Jobi et al. | |

OTHER PUBLICATIONS

Ellis R. Giles et al. "Container-Based Virtualization for Byte-Addressable NVM Data Storage", p. 2754-2763,IEEE International Conference on Big Data (Big Data) (Year: 2016).*
"U.S. Appl. No. 15/488,298, Non Final Office Action dated Jul. 26, 2018", 11 pages.
Giles, Ellis R. , "Container-Based Virtualization for Byte-Addressable NVM Data Storage", 2016 IEEE 978-1-4673-9005-7/16, pp. 2754-2763, 2016, 10 Pages.

* cited by examiner

*Primary Examiner* — Andy Ho
*Assistant Examiner* — Abdou K Seye
(74) *Attorney, Agent, or Firm* — Kwan & Olynick LLP

(57) ABSTRACT

Techniques and mechanisms described herein provide for a custom file system in a containerized application system in which an application instance may be created as a container based on an application image, which itself may be composed of some number of application image layers. By being aware of these application image layers, the graph driver can perform image layer level operations such as selectively updating image layers, storing image layers in a way that reflects class of service objectives, and responding to application level queries.

20 Claims, 8 Drawing Sheets

APPLICATION AWARE GRAPH DRIVER

CROSS-REFERENCE TO RELATED APPLICATIONS

This application claims priority to Provisional U.S. Patent Application No. 62/442,817, titled "Application Aware Graph Driver" and filed on Jan. 5, 2017 by Joseph Jobi and Vinod Jayaraman, and claims priority to Provisional U.S. Patent Application No. 62/445,623, titled "Implementation of a Graph Driver" and filed on Jan. 12, 2017 by Joseph Jobi and Vinod Jayaraman, both of which are hereby incorporated herein by reference in their entirety and for all purposes.

TECHNICAL FIELD

The present disclosure relates generally to containerized applications and more specifically to containerized scalable storage applications.

DESCRIPTION OF RELATED ART

One of the most difficult challenges facing software developers is interoperability of software between different computing environments. Software written to run in one operating system typically will not run without modification in a different operating system. Even within the same operating system, a program may rely on other programs in order to function. Each of these dependencies may or may not be available on any given system, or may be available but in a version different from the version originally relied upon. Thus, dependency relationships further complicate efforts to create software capable of running in different environments.

In recent years, the introduction of operating-system-level virtualization has facilitated the development of containerized software applications. A system configured with operating-system-level virtualization includes a container engine that operates on top of the operating system. Importantly, the container engine is configured to operate interchangeably in different environments (e.g., with different operating systems). At the same time, the container engine is configured to present a standardized interface to one or more software containers.

Each software container may include computer programming code for performing one or more tasks. Examples of software containers include web servers, email servers, web applications, and other such programs. Each software container may include some or all of the software resources that the software in the container needs in order to function. For example, if a software container includes a web application written in the Python programming language, the software container may also include the Python programming language modules that the web application relies upon. In this way, the software container may be installed and may execute successfully in different computing environments as long as the environment includes a container engine.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
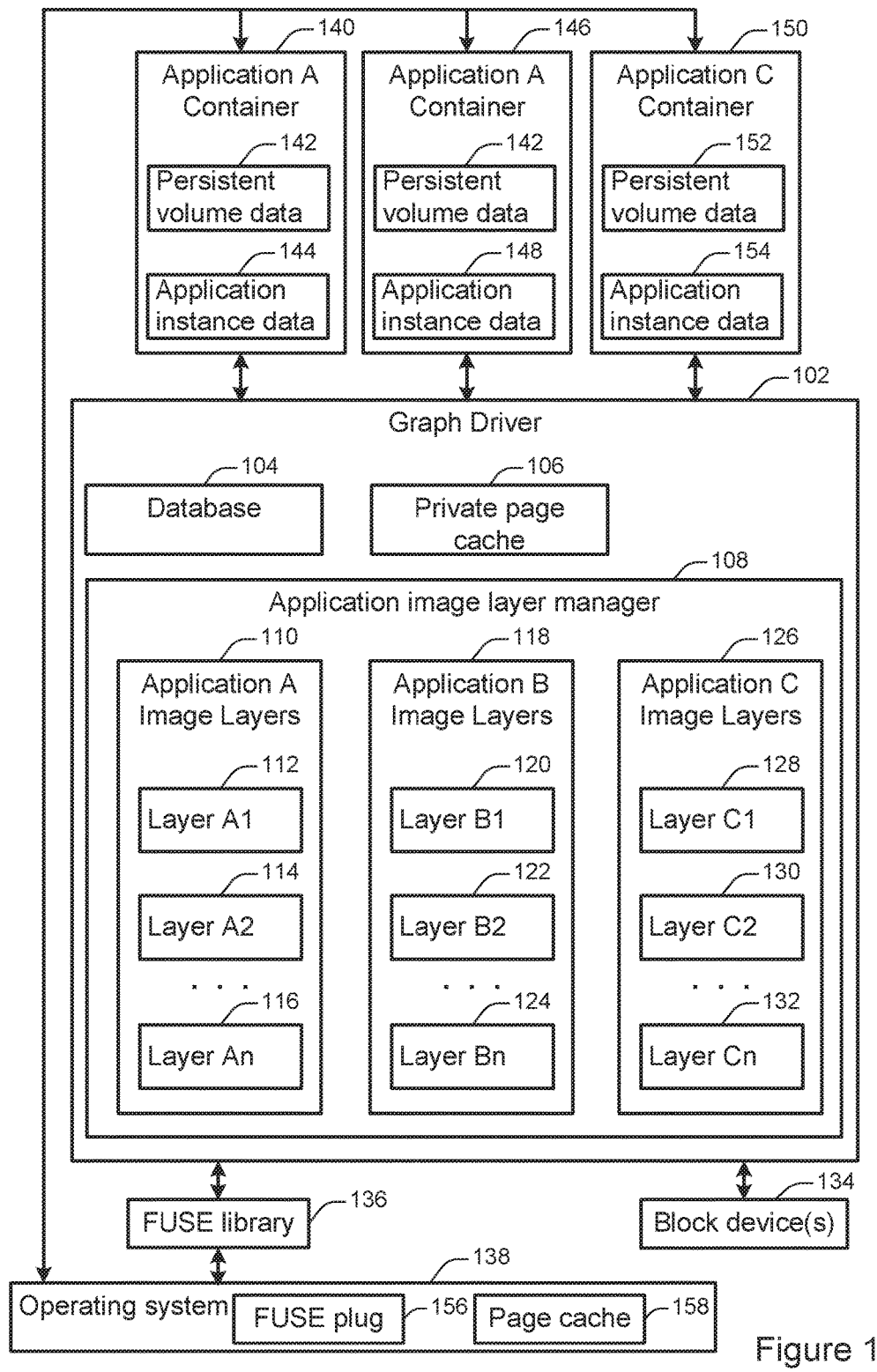
FIG. 1 illustrates an example of an arrangement of components in a containerized storage system.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms described herein provide for a custom file system in a containerized application system in which an application instance may be created as a container based on an application image, which itself may be composed of some number of application image layers. By being aware of these application image layers, the graph driver can perform image layer level operations such as selectively updating image layers, storing image layers in a way that reflects class of service objectives, and responding to application level queries.

Example Embodiments

Conventional containerized application systems employ a conventional file system to implement a graph driver. The unit of granularity in most conventional file systems is a single system call. For example, conventional file systems perform operations such as fsync, journaling, and checkpointing to ensure consistency between the data stored on disk and the data index.

According to techniques and mechanisms described herein, in some implementations, an application aware graph driver can download image layers with a much larger level of granularity. For instance, an application aware graph driver can retrieve an image layer or image update data via a network and write the information to disk. However, if the download process fails prior to the image layer being written to disk, the graph driver can simply re-download the entire image. In this way, the application aware graph driver can avoid performing costly operations such as fsync, journaling, and checkpointing. Accordingly, techniques and mechanisms described herein provide for more efficient operation and expanded capabilities of the computer itself.

In conventional file systems in containerized application contexts, the file system is unaware of how data stored via the file system is likely to be used. For this reason, conventional file systems tend to treat different blocks of data the same, and do not store data blocks in such a way as to address class of service objectives.

In some embodiments, techniques and mechanisms described herein may facilitate the storing of image layers in a way that reflects class of service obligations. For instance, one containerized application (e.g., MySQL) may be associated with image layer data that tends to be accessed in a relatively randomized fashion, while another containerized application (e.g., Apache) may be associated with image layer data that tends to be accessed in a relatively sequential fashion. In this situation, the containerized MySQL application may be stored on a solid-state drive while the containerized Apache application may be stored on a spinning disk drive.

In some embodiments, techniques and mechanisms described herein may facilitate the selective updating of application image layers. For instance, a containerized Apache application may be associated with several gigabytes of data divided among potentially many different image layers. In some instances, a patch to the containerized application may include only a limited amount of data (e.g., 1 MB).

In conventional file systems in containerized application contexts, the file system would need to download an entirely new version of the containerized application image or any application image layers that need to be updated. In contrast, techniques and mechanisms described herein may allow the downloading of a more limited amount of data (e.g., 1 MB) that can be used to patch the specific data blocks that contain data designated for updating.

In conventional file systems in containerized application contexts, data storage operates at the level of granularity of an individual file or an individual file system operation. As such, conventional containerized application file systems are unable to respond to requests about the characteristics and usage of application image layers stored on the file system. That is, conventional containerized application file systems are unaware of application image layers as a unit of granularity.

In some embodiments, techniques and mechanisms described herein may facilitate responding to queries that request information on an application image layer level. For example, a graph driver at a compute node may respond to queries that request information such as how many container applications associated with an application image layer checksum are instantiated at the compute note. As another example, the graph driver may respond to queries such as when an image layer was most recently used, whether an image layer is present at the graph driver, or a frequency with which the image layer is accessed.

According to techniques and mechanisms described herein, the term "graph driver" may refer to a native file system implemented in direct communication with one or more block devices such as conventional disk-based hard drives or solid state drives. By directly connecting an application-aware file system with block devices, many different file-system operations can be made more efficient. Thus, a graph driver as described herein differs from many conventional techniques in containerized storage systems which involve a custom file system layered on top of a conventional file system (e.g., Advanced Multi-Layered Unification Filesystem ("AUFS") which is often implemented on top of the ext4 file system, Overlay File System ("OverlayFS") which is often implemented on top of the XFS file system, devicemapper which is often implemented on top of a Logical Volume Manager ("LVM"), B-tree file system ("Btrfs") which is often implemented on top of an LVM, and other such approaches). In particular, a graph driver as described herein is more efficient than merged file systems or device-mapper based systems.

Techniques and mechanisms described herein may facilitate the configuration of a scalable storage container node system. In some embodiments, a scalable storage container node system may allow application containers in a virtualized application system to quickly and directly provision and scale storage. Further, the system may be configured to provide one or more user experience guarantees across classes of applications. According to various embodiments, the system may pool the capacity of different services into virtual storage volumes and auto-allocate storage as application storage traffic scales or bursts. For instance, a single virtual storage volume may include hundreds or thousands of terabytes of storage space aggregated across many different storage devices located on many different physical machines.

In some embodiments, storage containers may communicate directly with server resources such as hardware storage devices, thus reducing or eliminating unnecessary virtualization overhead. Storage containers may be configured for implementation in a variety of environments, including both local computing environments and cloud computing environments. In some implementations, storage volumes created according to the techniques and mechanisms described herein may be highly failure-tolerant. For example, a virtual storage volume may include data stored on potentially many different storage nodes. A storage node may fail for any of various reasons, such as hardware failure, network failure, software failure, or server maintenance. Data integrity may be maintained even if one or more nodes that make up a storage volume fail during data storage operations.

An application container is frequently constructed as a series of two or more layers. Each layer may include some number of files. For instance, an application container may include an operating system such as a Linux distribution as a base layer. Then, the application container may include additional layers, such as a MySQL layer and an Nginx layer, that each rely on the files included in the base layer.

Organizing files into layers may facilitate the separation of an application container into more granular components. In some embodiments, a layer may take the form of a tar archive, also known as a tarball. Alternately, a layer may take the form of any other file aggregation mechanism, such as a zip file or a folder of files. Thus, a container may be modified by replacing a single layer with a new version, without having to distribute a new copy of the entire container.

When an application container is loaded into memory for execution, the layers may need to be combined in some way in order to function together. For example, files from a MySQL layer may be combined in memory with files from a base operating system layer to create a functioning whole. The software that unifies layers into a functioning whole may be referred to as an image layer storage driver.

When employing conventional techniques, conflicts may arise if different layers include different versions of the same file. For example, an upper layer may either include a different version of the same file in a lower layer prior to being loaded into memory. As another example, an upper layer may write to a file in a lower layer after the layers have all been loaded into memory for execution. Conventional techniques to merging layers into a unified whole and addressing these potential conflicts include two approaches.

The first conventional technique is referred to as an overlay approach. Examples of union file systems are OverlayFS and UnionFS. A union file system combines the different layers to present a virtualized namespace. A union file system employs a copy-on-write technique. When an upper layer writes to a file that already exists in a lower layer, the image layer storage driver creates a new copy of the file. The file in the lower layer is not modified directly because other layers may reference the same file.

Union file systems may exhibit several drawbacks, which may include, but are not limited to: inode proliferation, incorrect file semantics (e.g., locking), memory consumption, and reloading the same file from disk more than once. Several specific examples of drawbacks are described below. First, union file systems incur a performance penalty and a disk usage penalty by copying an entire file from a lower layer when an upper layer writes to that file, even if the data that is written is a small portion of the overall file size.

Second, union file systems create problems with Inotify. Inotify (inode notify) is a Linux kernel subsystem that acts to extend filesystems to notice changes to the filesystem, and report those changes to applications. If writing to a file creates a new copy of that file, then the creation or editing of the new version of the file does not trigger a notification under Inotify, which may create a loss of functionality that breaks some applications.

Third, union file systems create inode proliferation. In a non-containerized application, two applications writing to the same file will access the file via the same inode. In this way, data written to the file by one application can be read from the file by the other application. However, the union file system approach of copying the file upon a write to the file generates a new inode for the copy. Therefore, if the base layer subsequently writes to the copy of the file, the upper layer that has copied the file will not be accessing the file with the same inode as the lower layer and thus will not be able to read the changes written by the base layer. Inode proliferation also means that a file may not be locked for the purpose of serializing reads and writes of the file and preventing conflicts or race conditions between different applications.

A second conventional technique for constructing an image layer storage driver is a snapshot approach. Under a snapshot approach, the image layer storage driver creates a block-wise snapshot for each subsequent layer. Each file stored in a storage system is composed of some number of data blocks. A snapshot of an upper layer may include only data blocks associated with files that the upper layer has added or data blocks associated with changes that the upper layer has made to files in the lower layer. The snapshot of the base layer may thus include all of the data in the base layer, while the snapshot of the upper layer may include a relatively limited amount of data that makes up the additions and changes provided by the upper layer. The image layer storage driver may load the upper layer into memory by first loading the snapshot associated with the base layer and then loading on top the snapshot associated with the upper layer.

Snapshot file systems typically provide relatively efficient usage of disk space but may exhibit several drawbacks. For example, snapshot file systems may exhibit inefficient usage of memory. If a container includes two different upper level layers, then a snapshot file system may load a complete snapshot of the base layer for each of the upper level layers. For example, the base layer of a container may include an operating system, a snapshot of which may require 10 gb to represent in memory. If the container includes two upper level layers that are associated with different snapshots that each require 1 gb to represent in memory, then loading both upper level layers into memory would require 11 gb (10 gb for the base layer and 1 gb for the upper layer) for a total of 22 gb of memory usage. In addition to being an inefficient usage of memory due to loading the base layer twice, the snapshot file system approach requires reading the base layer twice from disk, thus also incurring a performance penalty in loading the layers.

In conventional file systems, each I/O access is typically atomic at the system call level to support failure recovery. However, such approaches impose significant computing overhead in terms of system disk I/O operations and resources devoted to operations such as journaling. According to various embodiments, techniques and mechanisms described herein provide for improved file system data I/O. By providing an image-aware file system as a graph driver, changes to the file system that involve adding or modifying an image layer may be made in memory and committed to disk only when the layer is persisted as opposed to after every operation. Such techniques may provide for more efficient image building and downloading, less system disk I/O, and fewer computing resources consumed, thus improving the performance of the computer itself. Such techniques may also help to avoid storing blocks of zeroes on disk or in memory.

In conventional file systems, all data is typically treated as read/write. However, according to techniques and mechanisms described herein, application image layer data is treated as read-only, which simplifies the process for creating and destroying application containers. For example, all clones of an application can share the same base layer data, which avoids the computing costs associated with copying the base layer data. As another example, layers can be deleted in reverse order such that the newest layer is always deleted first, which provides for faster tear down of containers and avoids the need to roll back snapshots. As another example, layers are thin provisioned and instantiate new copies of data, which helps to keep layers independent as much as possible so that running containers do not interfere with one another. In this way, new containers can be created/started and existing containers can be stopped/deleted without pausing any running containers.

In conventional file systems, committing a new version of an existing container requires finding all changes made in the container compared to the base image layer, creating an archive that includes those changes, and then extracting those changes from the archive to another layer that then sits on top of the base layer. In contrast, techniques and mechanisms described herein provides for improved efficiency by swapping layers internally without moving data or traversing a namespace to identify changes between layers.

FIG. 1 illustrates an arrangement of components in a containerized application system implemented on a computing device. According to various embodiments, a containerized application system may serve as an intermediating layer between containerized applications and the computing device, allowing the same containerized application to run on different types of computing devices. For example, a containerized application system may be installed on top of different types of hardware computing devices and/or within different types of software operating systems. However, each containerized application may be written in such a way that it includes some or all of the resources (e.g., software libraries, software executables, etc.) necessary to run the application, regardless of the underlying architecture.

At 102, a graph driver is shown. According to various embodiments, the graph driver may act as a file system configured to support the storage and execution of containerized applications. In particular embodiments, the graph driver may be run in the user-space of the underlying operating system rather than in another part of the operating system such as the kernel-space.

According to some embodiments, graph driver 102 may include application image layer manager 108 which may be configured to store and maintain image layers associated with various applications that may be implemented in a containerized environment. Examples of containerized applications may include, but are not limited to: a privileged storage container application, a MySQL application, an Apache web server application, a file server application, a container configured for instantiation in the Docker containerized application environment, or any other suitable application. For example, a first application, such as application "A", may have an associated application image that is stored within application image layer manager 108. As shown in FIG. 1, such an application image may be stored as several layers in a stack, such as that shown by layer A1 112, layer A2 114, and layer An 116 of application A image layers 110. Similarly, for another application, such as application "B", another application image may be stored as application B image layers 118 that include layers such as layer B1 120, layer A1 112, and layer Bn 124. Furthermore, yet another application, such as application "C", may have another application image that is stored as application C image layers 126 that include layers such as layer C1 128, layer C2 130, and layer Cn 132. While FIG. 1 illustrates image layers associated with three applications, any number of applications may be implemented, and each application may have anywhere from one to many image layers.

In some embodiments, application image layers may include computer software instructions necessary for instantiation a containerized application. Each layer may supplement and/or modify any or all lower layers, and the layers may be combined to provide the instructions for generating the complete application. For example, if Application A were a MySQL application, then Layer A1 112 may include one or more basic software libraries for database operations, while Layer A2 114 may include application logic for implementing the MySQL application. Application A may also include any number of additional application layers. Layer An 116 may include one or more patches or other portions of computer software instructions that modify instructions in lower layers. By combining these different layers, the MySQL application may be instantiated. Many different types and configurations of applications are possible.

In particular embodiments, the same application image layer may be included in different applications. For instance, the application image layer A1 112 is included in both the Application A 110 and the application B 118. An example of such a configuration may be an image layer associated with a commonly used software program such as the Apache web server, which may be included as a layer in different applications that rely on such a web server. When the same image layer is included in different applications, the image layer need only be stored once because the graph driver 102 can provide read-only access to the same image layer for the instantiation of different applications.

At 104, a database is shown. In some implementations, the database 104 may be used to record information about application layers accessible to the graph driver 102. For instance, in the example shown in FIG. 1, the database may store information about Application A image layers 110, Application B image layers 118, and Application C image layers 126. The database may store various types of information about a given application and/or application image layer. For instance, for a given application image layer the database may store a name, a checksum, date or time information about when the application image layer was stored or created, an application identifier, or any other relevant information. A checksum may provide a hash value or other aggregate identifier for the content of the image layer. For instance, the checksum may include the result of applying an MD5, SHA-1, or other type of hash function to all or part of the image layer.

An operating system, such as operating system 138, may be coupled with graph driver 102 and application containers 140, 146, and 150. In various embodiments, operating system 138 may be configured to manage hardware and software resources within system 100, as well as provide common services for various applications implemented within system 100. In various embodiments, operating system 138 may include FUSE plug 156 and page cache 158. FUSE plug 156 may be configured to provide an interface between FUSE library 136 and operating system 138. Accordingly, FUSE plug 156 may facilitate the implementation of a Filesystem in Userspace (FUSE). FUSE may provide an infrastructure for non-privileged users in an operating system to run a file system without editing operating system kernel code. Within this infrastructure, the FUSE library 136 may provide a bridge from the file system to the operating system interfaces.

In some embodiments, the FUSE plug 156 may provide a standard interface for performing file system operations. For instance, an application may transmit an instruction to the FUSE plug 156 to retrieve a file from disk, store a file to disk, read a directory, create a directory, or perform any other such operation. The instruction may be transmitted in such a way that it is independent of the actual file system that implements the instruction. The operating system 138 may transmit the instruction to the graph driver 102 via the FUSE library 136, which may translate the instruction for interpretation by the graph driver 102. In this way, the graph driver 102 and the operating system 138 may operating independently. For instance, the same graph driver 102 may be used in conjunction with different operating systems.

The containerized application system may further include one or more block devices, such as block device 134. According to various embodiments, a block device may include one or more components for storing data. For example, a block device may include a spinning hard disk drive, a solid state drive, a network drive, an optical drive, or any other such component. The graph driver 102 may have access to a single block device or may have access to more block devices, depending on factors such as the hardware capabilities of the underlying system and the configuration parameters of the graph driver 102, the operating system 138, or other system components. In some implementations, a block device may be used to store data associated with the graph driver. For instance, a block device may be used to store application image layer data, database records, and/or private page cache data.

According to various embodiments, the graph driver 102 may be configured to store and manage application images associated with application containers. Application containers may be instantiated and implemented based on shared application images. The application image layers may be stored as read-only, and may be used as the basis of instantiating application containers. For example, application containers, such as application A container 140, application A container 146, and application C container 150 may be instantiated based on their respective application image layers which may be application A image layers 110 and application C image layers 126. In this example, the underlying image layers may be stored and shared in application image layer manager 108, and each application container may store application instance data used to instantiate a particular instance of an application.

In some implementations, more than one instance of a single application container may be created. For instance, in FIG. 1, Application A Container A 140 and Application A Container A 146 are both instances of Application A. In particular embodiments, one, two, several, or various numbers of instances of a single application container may be created. For instance, different instances of a containerized MySQL application may be created for use in storing database records for different applications.

In some implementations, instantiating an Application Container instance may involve providing the instance with a way of accessing read-only application files associated with the application. For instance, image layer data associated with an application may provide read-only computer programming language instructions and other data that is used to create a new instance of that application. Although different instances of an application may be created, this application image layer data may remain the same. Thus, two different instances of application A may be implemented and executed based on the same shared application data included in application A image layers 110. In this way, potentially any number of instances of application containers may be implemented for a particular application, and all of the instances may refer back to the same shared application image layers.

In FIG. 1, Application A Container 140 includes persistent volume data 142, Application A Container 146 includes persistent volume data 142, and Application C Container 146 includes persistent volume data 152. This persistent volume data corresponds with the Application Image Layer data for those applications. Because Application A Container 140 and Application Container A 146 correspond to the same application and because the image layer data is stored as "read-only", these two application instances share the same persistent volume data 142, which corresponds to the Application A Image Layers 110.

In some implementations, instantiating an application container may involve providing an application instance with a way of storing and retrieving application data specific to the application instance. Configurations and changes of such instances may be saved in the application instance data as snapshots of the application containers and their associated underlying application image layers. In FIG. 1, Application A Container 140 includes application instance data 144, Application A Container 146 includes application instance data 148, and Application C Container 146 includes application instance data 154.

Techniques and mechanisms described herein may be implemented using image specific snapshotting techniques that are configured for page cache consumption, image snap creation time and inode count. In some implementations, the graph driver creates layers for images and read-write layers on top of those for containers. Each image will have a base layer, in which files of the image are populated initially. Additional layers may be created on top of the base layer and for each additional layer in the image being extracted. Each layer shares data from the previous layer. If a layer modifies any data, that data is visible from the layers on top of that layer, but not from the layers below that layer. Also if a container modifies data in an image it is loaded from, that modified data is not visible from any other derived layers on top of that image layer.

According to various embodiments, a layer in an image is a read-only snapshot sitting on top of the previous layer in the image. Therefore, these derived layers share common data between each other. A layer is immutable after its contents are completely populated. When any existing data inherited from a previous layer is modified while populating data to a new layer, a branch-on-write (BOW) operation is performed, for instance in increments of 4 KB blocks. New data can be written to a newly allocated location on the back-end block storage device, and old data will no longer be accessible from the layer (or any other layer created on top of that subsequently) which modified the data. Similarly, any files deleted from a layer are not visible from that layer or on any of the layers on top of that layer.

According to various embodiments, when a read-write layer is created while starting a new container (two such layers for every container), a read-write snapshot is created on top of the image layer and mounted from the container. The container can see all the data from the image layers below the read-write layer and can create new data or modify any existing data as needed. When any existing data is modified, the data is not modified in the image layer. Instead a private copy with new data is made available for the read-write layer.

In some embodiments, instance-specific data may include application data specific to the runtime of the application. For instance, different instances of a MySQL application container may include different data stored in the different MySQL databases. As another example, instance-specific data may include modifications to the underlying files. For example, a containerized MySQL application may modify a configuration file associated with that application. The modified data may be stored in the application instance data. This application instance data may supersede the read-only persistent volume data associated with the application. In this way, different instances of a containerized application may be unique at run-time even though they rely on the same underlying read-only image layer data.

In various embodiments, application images may be managed such that application containers are implemented as parallel snapshots of the underlying application image layers. Accordingly, the application containers may be implemented at a same hierarchical level, and not layered. For instance, Application A Container instance 140 and Application A Container instance 146 may be created as parallel and equivalent instances of the same application A rather than in a hierarchical or dependent relationship, with one of the container instances dependent or descended from the other.

The operating system 138 includes a page cache 158, and the graph driver 102 includes a private page cache 106. According to various embodiments, a page cache is a record of where data is stored on a storage device such as one of the block devices 134. The page cache 158 may be used to provide page cache services to the operating system 158. For instance, the page cache 158 may record the storage location of operating system files and/or user data associated with the operating system.

In particular embodiments, the private page cache 106 may be used to record storage information for data specific to the graph driver 102. For instance, the private page cache 106 may be used to store data related to application image layers and/or application instance data. Because the graph driver 102 has access to a private page cache, the graph driver can provide efficient storage and access to data. For example, if an application container creates instance data that modifies or supersedes image layer data, then the difference between the modified and modified data can be stored as a limited number of data blocks rather than storing an entirely new copy of the entire image layer data. As another example, by managing a private page cache, the graph driver 102 can provide multiple instances of an application with access to the same data blocks for the read-only application image layer data associated with the application container. Thus, the persistent volume data for an application container can serve as a thin layer referencing this shared data rather than a separate copy of the data.

Figure 2:
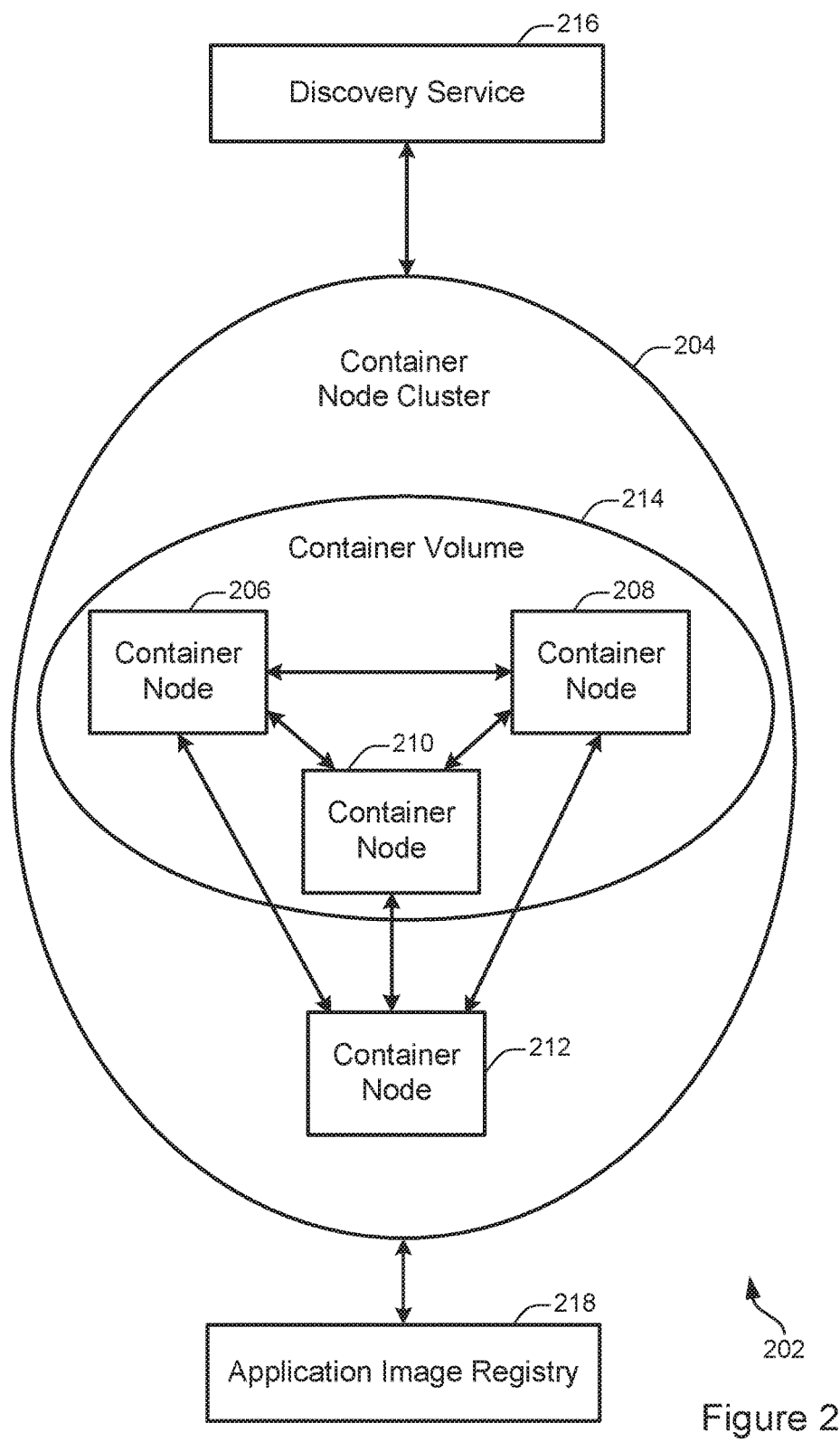
FIG. 2 illustrates an example of a scalable container node system, configured in accordance with one or more embodiments.

FIG. 2 illustrates an example of a scalable container node system 202. In some embodiments, the scalable container node system 202 may be capable of providing storage operations or other types of functionality within the context of one or more servers configured to implement a distributed container system. The scalable container node system 202 includes a container node cluster 204, which includes container nodes 206, 208, 210, and 212. The container nodes 206, 208, and 210 are combined to form a container volume 214. The scalable container node system 202 also includes a discovery service 216 and an application image layer registry 218.

At 204, the container node cluster 204 is shown. According to various embodiments, a container node cluster may include one or more container nodes collectively configured to aggregate and abstract storage resources for the purpose of performing storage-related operations. Although the scalable container node system 202 shows only a single container node cluster, implementations of the techniques discussed herein may frequently include thousands or millions of container node clusters in a scalable container node system.

At 206, 208, 210, and 212, container nodes are shown. A container node may be configured as discussed with respect to the container node 202 shown in FIG. 202 or may be arranged in a different configuration. According to various embodiments, container nodes may be configured to aggregate operations to create a volume that spans more than one container node. By creating such a volume, resources such as physical disk drives that are located at different physical servers may be combined to create a virtual volume that spans more than one physical server.

In some implementations, the container volume may be accessible to an application through a container engine, as discussed with respect to FIG. 2. For instance, a container located at the container node 206 may receive a request to perform a storage operation on a storage volume that spans multiple storage nodes, such as the nodes 206, 208, 210, and 212 shown in FIG. 2. The container may then coordinate communication as necessary among the other container nodes in the cluster and/or the discovery service 216 to execute the request.

At 214, a container volume is shown. According to various embodiments, a container volume may act as a logical storage device for storing and retrieving data. The container volume 214 includes the container nodes 206, 208, and 210. However, container volumes may be configured to include various numbers of container nodes. When acting as a storage volume, A container volume may aggregate storage resources available on its constituent nodes. For example, if each of the container nodes 206, 208, and 210 includes 2 terabytes of physical data storage, then the storage volume 214 may be configured to include 6 terabytes of physical data storage.

In some implementations, a storage volume may provide access to data storage for one or more applications. For example, a software application running on any of container nodes 206-212 may store data to and/or retrieve data from the storage volume 214. As another example, the storage volume 214 may be used to store data for an application running on a server not shown in FIG. 2.

At 216, a discovery service is shown. According to various embodiments, the discovery service may be configured to coordinate one or more activities involving container node clusters and/or container nodes. For example, the discovery service may be configured to initialize a new container node cluster, destroy an existing container node cluster, add or remove a container node from a container node cluster, identify which node or nodes in a container node cluster are associated with a designated storage volume, and/or identify the capacity of a designated storage volume.

In some implementations, a discovery service may be configured to add a container node to a container node cluster. An example of such a method is described in additional detail with respect to FIG. 4. In some implementations, a discovery service may be configured to facilitate the execution of a storage request.

According to various embodiments, the discovery service may be configured in any way suitable for performing coordination activities. For instance, the discovery service may be implemented as a distributed database divided among a number of different discovery service node. The discovery service may include a metadata server that store information such as which container nodes correspond to which container node clusters and/or which data is stored on which container node. Alternately, or additionally, the metadata server may store information such as which container nodes are included in a storage volume.

At 218, an application image layer registry is shown. According to various embodiments, the application image layer registry may serve as a central repository for application image layers. For instance, application image layers may be identified by name, checksum (e.g., Sha-1, MD5, etc.), and/or other information. Container nodes may retrieve application image layers from the registry upon request by identifying an application image layer for download. Although only a single application image layer registry is shown in FIG. 2, some implementations may involve more than one application image layer, for instance to handle increased request loads.

Figure 3:
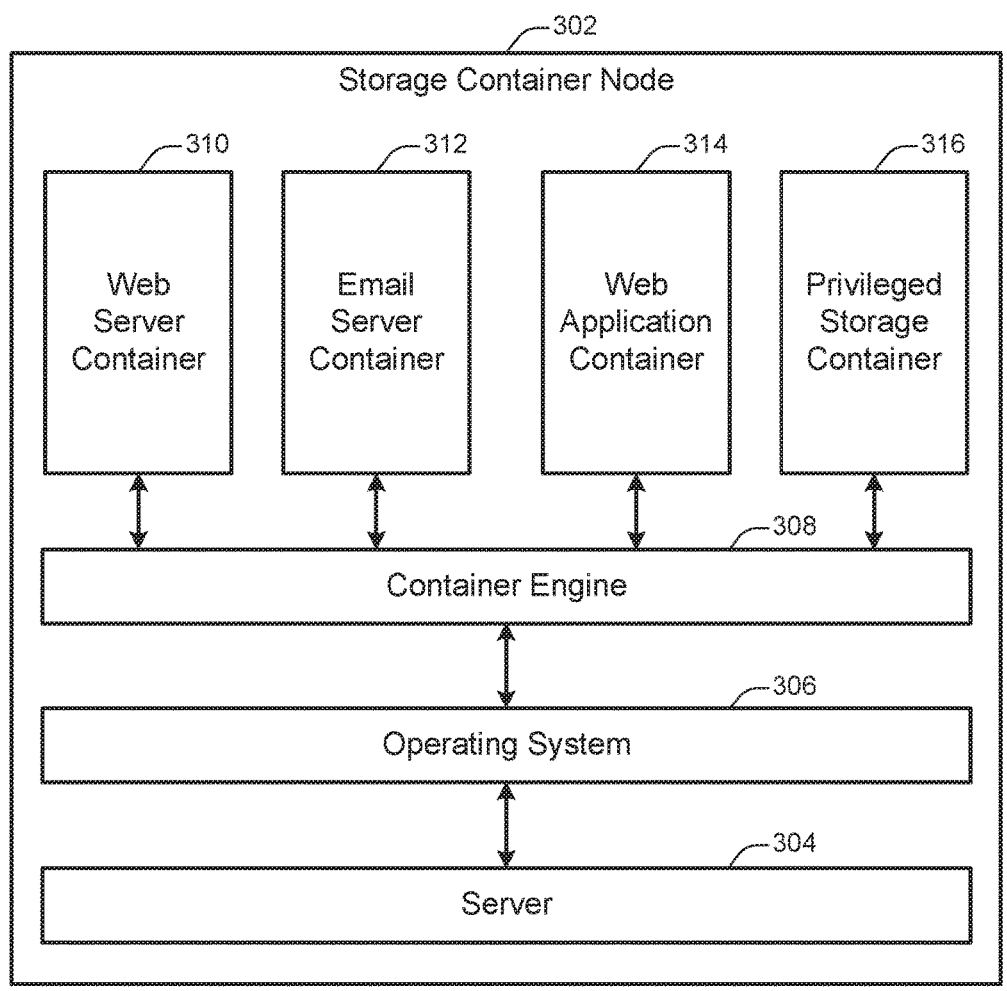
FIG. 3 illustrates an example of a storage container node, configured in accordance with one or more embodiments.

FIG. 3 illustrates an example of a storage container node 302. According to various embodiments, a storage container node may be a server configured to include a container engine and a privileged storage container. The storage container node 302 shown in FIG. 3 includes a server layer 304, an operating system layer 306, a container engine 308, a web server container 310, an email server container 312, a web application container 314, and a privileged storage container 316.

In some embodiments, the storage container node 302 may serve as an interface between storage resources available at a server instance and one or more virtual storage volumes that span more than one physical and/or virtual server. For example, the storage container node 302 may be implemented on a server that has access to a storage device. At the same time, a different storage container node may be implemented on a different server that has access to a different storage device. The two storage nodes may communicate to aggregate the physical capacity of the different storage devices into a single virtual storage volume. The single virtual storage volume may then be accessed and addressed as a unit by applications running on the two storage nodes or at on another system.

At 304, the server layer is shown. According to various embodiments, the server layer may function as an interface by which the operating system 306 interacts with the server on which the storage container node 302 is implemented. A storage container node may be implemented on a virtual or physical server. For example, the storage container node 302 may be implemented at least in part on the server shown in FIG. 5. The server may include hardware such as networking components, memory, physical storage devices, and other such infrastructure. The operating system layer 306 may communicate with these devices through a standardized interface provided by the server layer 304.

At 306, the operating system layer is shown. According to various embodiments, different computing environments may employ different operating system layers. For instance, a physical or virtual server environment may include an operating system based on Microsoft Windows, Linux, or Apple's OS X. The operating system layer 306 may provide, among other functionality, a standardized interface for communicating with the server layer 304.

At 308, a container engine layer is shown. According to various embodiments, the container layer may provide a common set of interfaces for implementing container applications. For example, the container layer may provide application programming interfaces (APIs) for tasks related to storage, networking, resource management, or other such computing tasks. The container layer may abstract these computing tasks from the operating system. A container engine may also be referred to as a hypervisor, a virtualization layer, or an operating-system-virtualization layer.

In some implementations, the separation of the computing environment into a server layer 304, an operating system layer 306, and a container engine layer 308 may facilitate greater interoperability between software applications and greater flexibility in configuring computing environments. For example, the same software container may be used in different computing environments, such as computing environments configured with different operating systems on different physical or virtual servers.

At storage container node may include one or more software containers. For example, the storage container node 302 includes the web server container 220, the email server container 312, and the web application container 314. A software container may include customized computer code configured to perform any of various tasks. For instance, the web server container 220 may provide files such as webpages to client machines upon request. The email server 312 may handle the receipt and transmission of emails as well as requests by client devices to access those emails. The web application container 314 may be configured to execute any type of web application, such as an instant messaging service, an online auction, a wiki, or a webmail service. Although that storage container node 302 shown in FIG. 3 includes three software containers, other storage container nodes may include various numbers and types of software containers.

At 316, a privileged storage container is shown. According to various embodiments, the privileged storage container may be configured to facilitate communications with other storage container nodes to provide one or more virtual storage volumes. A virtual storage volume may serve as a resource for storing or retrieving data. The virtual storage volume may be accessed by any of the software containers 220, 312, and 314 or other software containers located in different computing environments. For example, a software container may transmit a storage request to the container engine 308 via a standardized interface. The container engine 308 may transmit the storage request to the privileged storage container 316. The privileged storage container 316 may then communicate with privileged storage containers located on other storage container nodes and/or may communicate with hardware resources located at the storage container node 302 to execute the request.

In some implementations, one or more software containers may be afforded limited permissions in the computing environment in which they are located. For example, in order to facilitate a containerized software environment, the software containers 310, 312, and 314 may be restricted to communicating directly only with the container engine 308 via a standardized interface. The container engine 308 may then be responsible for relaying communications as necessary to other software containers and/or the operating system layer 306.

In some implementations, the privileged storage container 316 may be afforded additional privileges beyond those afforded to ordinary software containers. For example, the privileged storage container 316 may be allowed to communicate directly with the operating system layer 306, the server layer 304, and/or one or more physical hardware components such as physical storage devices. Providing the storage container 316 with expanded privileges may facilitate efficient storage operations such as storing, retrieving, and indexing data.

Figure 4:
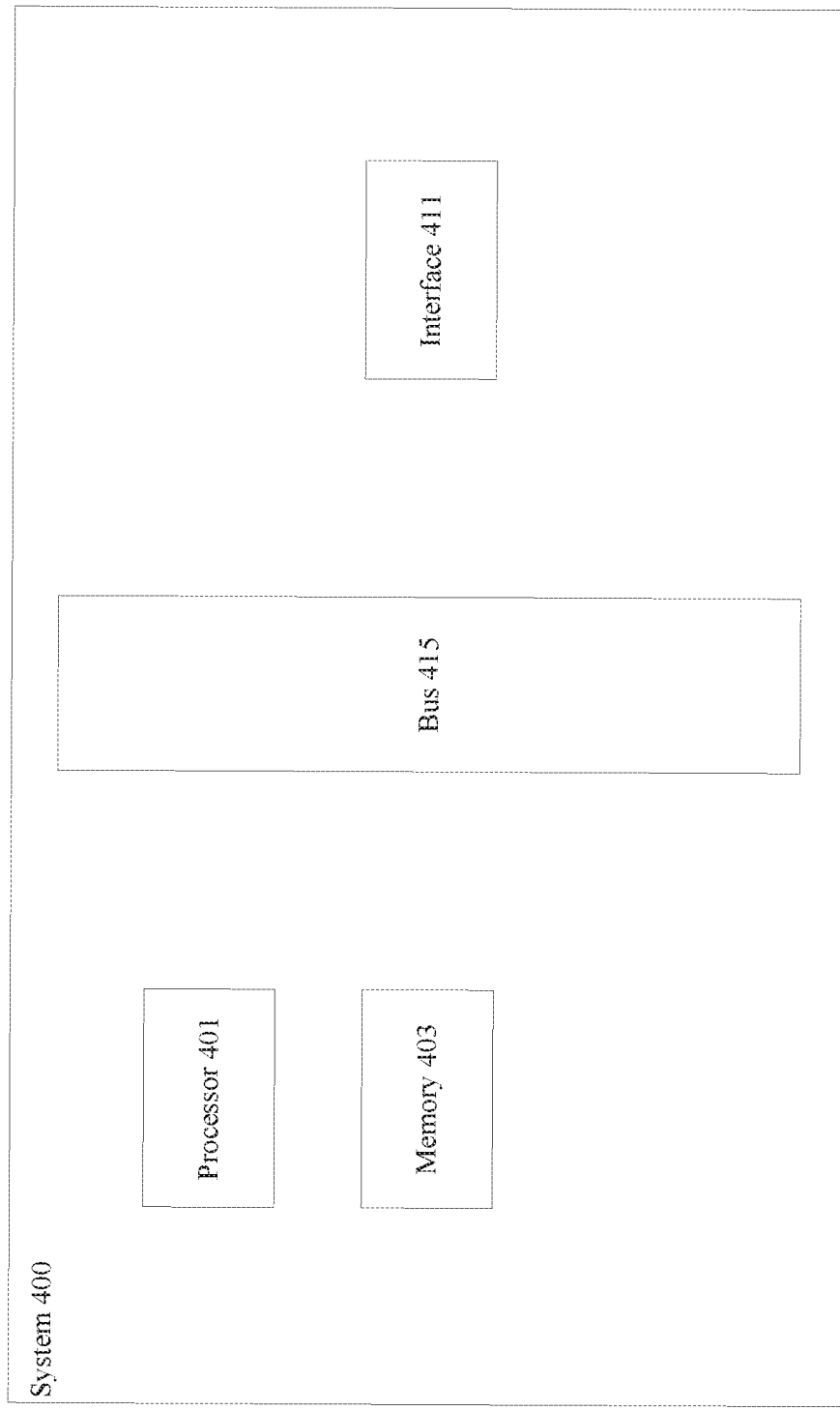
FIG. 4 illustrates an example of a server.

FIG. 4 illustrates one example of a server. According to particular embodiments, a system 400 suitable for implementing particular embodiments of the present invention includes a processor 401, a memory 403, an interface 411, and a bus 415 (e.g., a PCI bus or other interconnection fabric) and operates as a streaming server. When acting under the control of appropriate software or firmware, the processor 401 is responsible for modifying and transmitting live media data to a client. Various specially configured devices can also be used in place of a processor 401 or in addition to processor 401. The interface 411 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 400 is a server configured to run a container engine. For example, the system 400 may be configured as a storage container node as shown in FIG. 1. The server may include one or more hardware elements as shown in FIG. 4. In some implementations, one or more of the server components may be virtualized. For example, a physical server may be configured in a localized or cloud environment. The physical server may implement one or more virtual server environments in which the container engine is executed. Although a particular server is described, it should be recognized that a variety of alternative configurations are possible. For example, the modules may be implemented on another device connected to the server.

Figure 5:
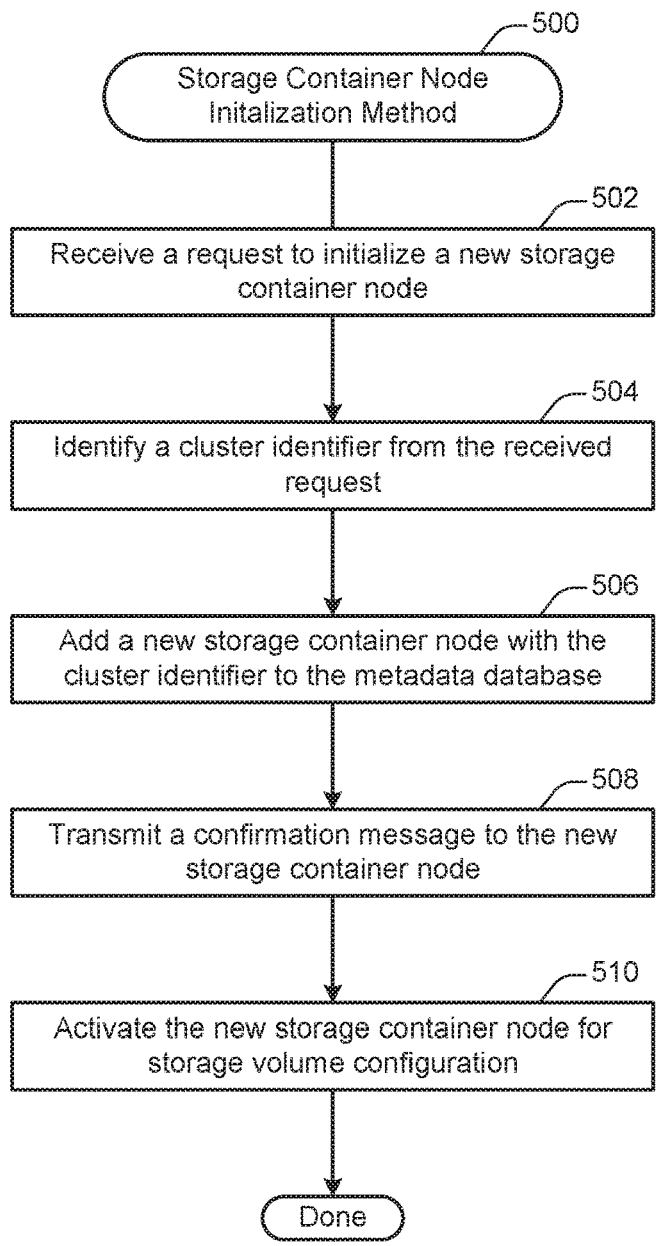
FIG. 5 illustrates an example of a method for initializing a new storage container node within a storage container node cluster.

FIG. 5 illustrates an example of a method 500 for initializing a new storage container node within a storage container node cluster, performed in accordance with one or more embodiments. The method 500 may be performed at a discovery service such as the discovery service 216 shown in FIG. 2.

At 502, a request to initialize a new storage container node is received. According to various embodiments, the request to initialize a new storage container node may be generated when a storage container node is activated. For instance, an administrator or configuration program may install a storage container on a server instance that includes a container engine to create a new storage container node. The administrator or configuration program may than provide a cluster identifier indicating a cluster to which the storage container node should be added. The storage container node may then communicate with the discovery service to complete the initialization.

At 504, a cluster identifier is identified from the received request. According to various embodiments, the cluster identifier may be included with the received request. Alternately, or additionally, a cluster identifier may be identified in another way, such as by consulting a configuration file.

At 506, a new storage container node with the cluster identifier is added to the metadata database. In some implementations, the metadata database may be implemented at the discovery service and may include various types of information for configuring the storage container node system. The metadata database may identify one or more clusters corresponding to each storage container node. For example, the metadata database may include a row of data that includes both the cluster identifier and an identifier specific to the new storage container node.

At 508, a confirmation message is transmitted to the new storage container node. According to various embodiments, the confirmation message may indicate to the new storage container node that initialization was successful and that the new storage container node is ready to be included in a storage container volume.

At 510, the new storage container node is activated for storage volume configuration. According to various embodiments, activating a storage container node for storage volume configuration may include responding to one or more requests to add the storage container node to a storage volume. For instance, an administrator or configuration program may transmit a request to the discovery service to add the new storage container node to a designated storage volume. The discovery service may then update configuration information in the metadata server to indicate that the designated storage volume includes the new storage container node. Then, the discovery service may direct subsequent requests involving the designated storage volume to the new storage container node or any other storage container node associated with the designated storage volume.

Figure 6:
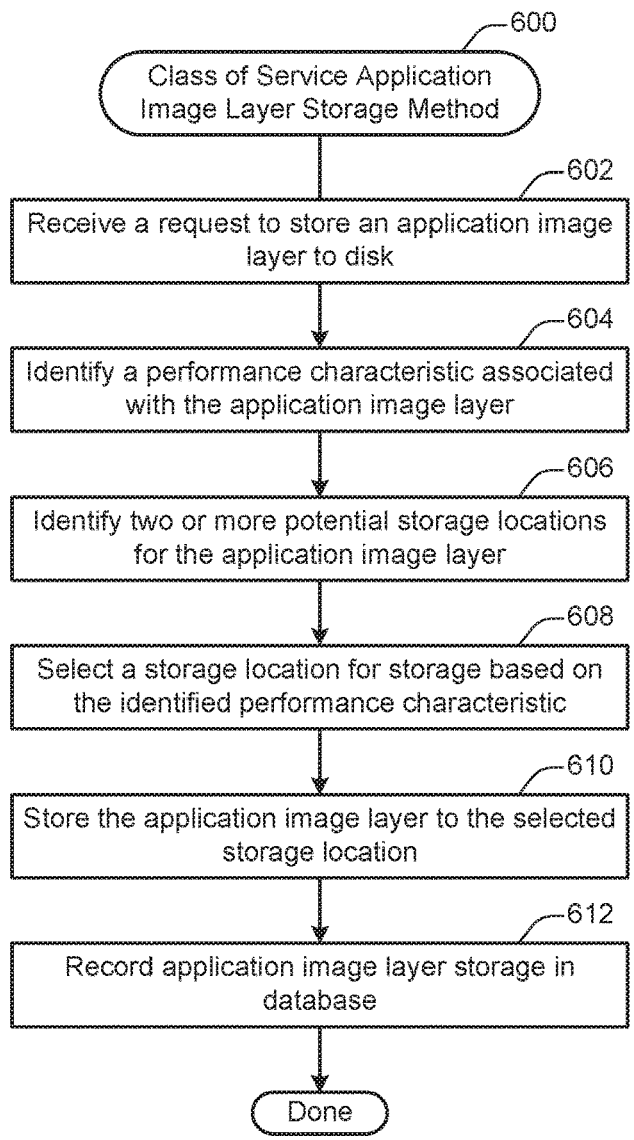
FIG. 6 illustrates an example of a method for class of service application image layer storage.

FIG. 6 illustrates an example of a method 700 for class of service application image layer storage. According to various embodiments, the method 700 may be performed at a graph driver such as the graph driver 102 shown in FIG. 1. The method 700 may be used to store an application image layer to disk in such a way as to reflect the performance characteristics and/or performance goals associated with the application image layer. For instance, the method 700 may be used to provide storage reflecting the class of service on a per image, per container, and/or per image layer basis.

At 602, a request to store an application image layer to disk is received. According to various embodiments, the request may be generated when an application image layer is retrieved from a remote location for use on the local system to generate an application container. For instance, when a request to instantiate a new application container is received, the system may retrieve any application image layers necessary for instantiating the new application container.

In some implementations, the request to store an application image layer to disk may be generated periodically. For example, the system may periodically evaluate the storage of image layers at the graph driver. Then, application image layers may be moved from one storage location to another to reflect features such as performance characteristics and available disk space.

At 604, a performance characteristic associated with the application image layer is identified. According to various embodiments, the performance characteristic may be associated with an application as a whole or may vary for different application image layers associated with an application.

In some implementations, the performance characteristic may provide an indication regarding how data associated with the application image layer is likely to be accessed. For example, data associated with a MySQL application may tend to be accessed in a relatively random fashion, while data associated with an Apache application may tend to be accessed in a relatively sequential fashion. As another example, data associated with one application or application image layer may tend to be accessed relatively frequently, while data associated with a different application or application image layer.

In some implementations, the performance characteristic may indicate a prioritization of data access between different applications or application image layers. For example, one application or application image layer may be designated as having a relatively high priority, while another application or application image layer may be designated has having a relatively low priority.

According to various embodiments, the performance characteristic may be identified in any of various ways. For example, the performance characteristic may be identified by receiving configuration information from a remote location such as a central image layer repository or a different node in a cluster of nodes. As another example, the performance characteristic may be determined dynamically and/or automatically by the graph driver. For instance, the graph driver may review past performance information associated with the application and determine characteristics such as access frequency and/or access sequentialness.

At 606, two or more potential storage locations are identified for the application image layer. In some embodiments, a graph driver may have access to a number of different block devices, such as the block devices 134 shown in FIG. 1. Each block device may be associated with any of various types of characteristics. For example, a block device may be a solid-state drive or a spinning disk drive. As another example, different block devices may vary in terms of storage capacities, data retrieval latencies, data retrieval bandwidth, and other such characteristics. Such characteristics may be provided explicitly by the operating system or may be inferred by the graph driver based on past data access.

At 608, a storage location is selected for storage based on the identified performance characteristic. According to various embodiments, the storage location may be selected by matching the characteristics of the block device with the characteristics of the application image layer. For example, an application image layer likely to be accessed in a relatively random fashion may be stored on a solid-state drive, while an application image layer likely to be accessed in a relatively sequential fashion may be stored on a spinning disk drive. As another example, an application image layer having a relatively higher priority may be located on a block device with relatively lower latency, while an application image layer having a relatively lower priority may be located on a block device with relatively higher latency. As yet another example, an application image layer requiring a relatively high volume of data access may be located on a block device with a relatively higher data access bandwidth, while an application image layer requiring a relatively low volume of data access may be located on a block device with a relatively lower data access bandwidth.

At 610, the application image layer is stored to the selected storage location. According to various embodiments, storing the image layer to the selected storage location may involve communicating with one or more of storage devices, such as the block devices shown in FIG. 134. For instance, the image layer may be transferred from memory to the selected block device.

At 612, the storage of the application image layer is recorded in a database. According to various embodiments, recording the storage of the application image layer in the database may involve adding or updating a database entry to include information such as a name, checksum, storage location, and/or other such metadata associated with the application image layer. For instance, the information may be recorded in the database 104 shown in FIG. 1.

Figure 7:
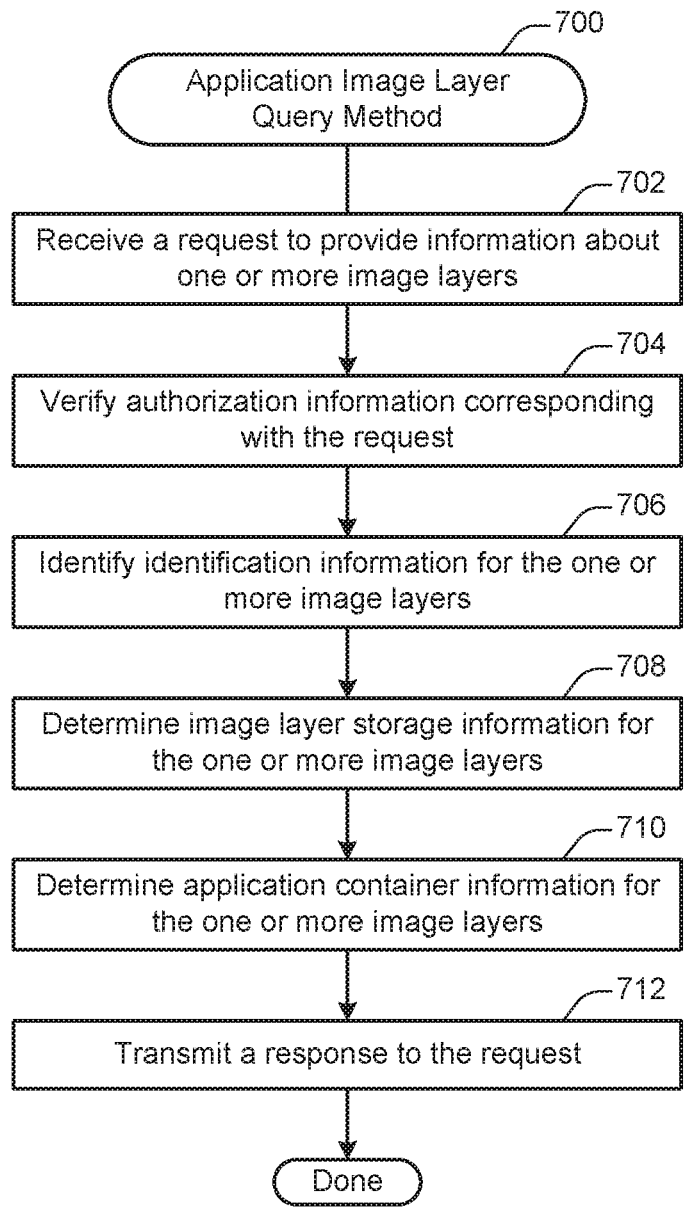
FIG. 7 illustrates an example of a method for application image layer querying.

FIG. 7 illustrates an example of a method 700) for application image layer querying. According to various embodiments, the method 700 may be performed at a graph driver such as the graph driver 102 shown in FIG. 1. The method 700 may be used to provide any of various types of information about application images stored via the graph driver.

At 702, a request to provide information about one or more image layers is received. In some implementations, a request may be received via a network from a centralized control point or a different node in a distributed system. Alternately, or additionally, a request may be generated locally, for instance when determining where to store an application image layer in the method 600 shown in FIG. 6.

At 704, authorization information corresponding with the request is verified. According to various embodiments, verifying authorization information may allow the graph driver to ensure that the source of the query is authorized to access the information requested by the query. For instance, the graph driver may use information associated with the request to verify that the request originated from a central control point or another node in a distributed system.

At 706, identification information for the one or more image layers is identified. In some embodiments, the identification information may be used to select one or more image layers for retrieving information. For instance, the identification information may include a checksum (e.g., a SHA-1 hash, an MD5 hash, etc.), a name, or other such metadata. The identification information may be included in the request or retrieved from a different location.

At 708, image layer storage information for the one or more image layers is determined. At 710, application container information for the one or more image layers is determined. According to various embodiments, the information may be determined by retrieving the information from a database such as the database 104 shown in FIG. 1. Alternately, or additionally, the information may be determined by identifying application containers that are instantiated, such as the application containers 140, 146, and 150 shown in FIG. 1.

In some implementations, any or all of a variety of information may be retrieved. For instance, the graph driver may determine whether an image layer is stored at the graph driver, whether an image layer is associated with an instantiated application container, the number of instantiated application containers associated with an image layer, the most recent time at which an image layer was associated with an instantiated application container, or any other such information.

At 712, a response to the request is transmitted. According to various embodiments, the response may be transmitted via a network to the source of the request or to a different location such as a centralized control point. In particular embodiments, the response may be broadcast to multiple nodes in a distributed system. Alternately, or additionally, the response may be provided to a locally running process, such as the method 600 shown in FIG. 6.

Figure 8:
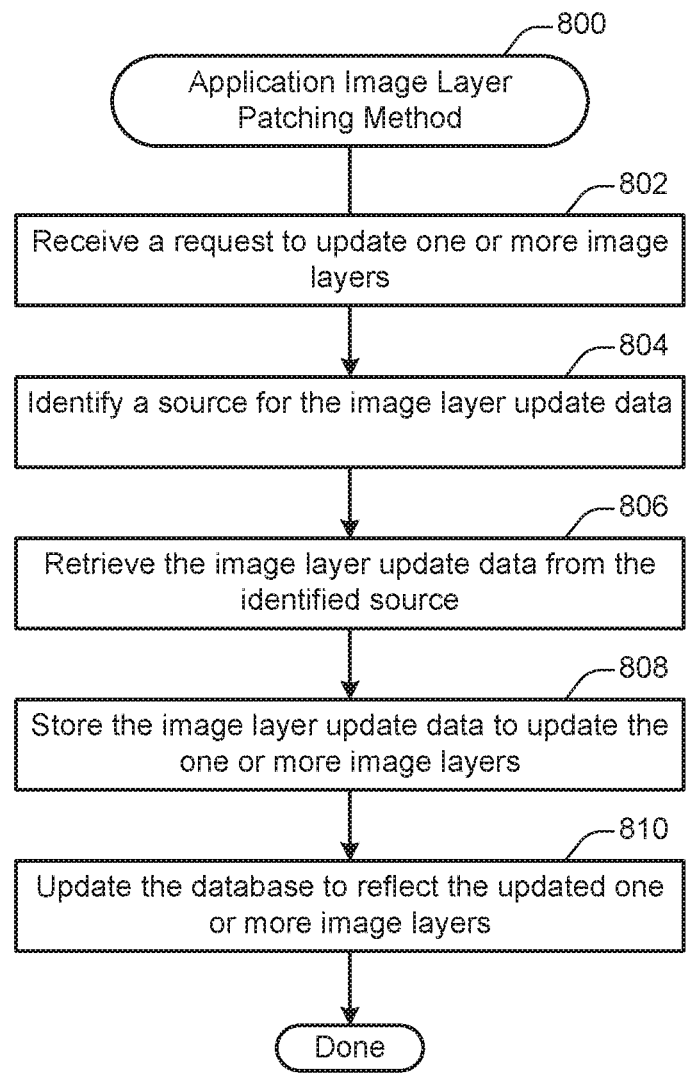
FIG. 8 illustrates an example of a method for application image layer patching.

FIG. 8 illustrates an example of a method 800 for application image layer patching. According to various embodiments, the method 800 may be performed at a graph driver such as the graph driver 102 shown in FIG. 8. Because the graph driver is aware of application image layers as a unit of granularity, the graph driver can in some instances selectively update portions of individual image layers without needing to download an entire application image or application image layer.

At 802, a request to update one or more image layers is received. According to various embodiments, a request may be transmitted from a central control point in a distributed system, such as the repository 218 shown in FIG. 2. Alternately, or additionally, a request may be transmitted from a different node in the distributed system. In some implementations, a request may be generated periodically. For instance, the graph driver may periodically communicate with remote locations on the network to determine if updates are available for container images stored locally at the graph driver.

At 804, a source for the image layer update data is identified. At 806, the image layer update data is retrieved from the identified image source. According to various embodiments, the image layer update data may be identified and/or retrieved from any of various locations. For example, image layer update data may be stored at a centralized storage point such as the repository 218 shown in FIG. 2. Alternately, or additionally, image layer update data may be retrieved in a distributed fashion from other storage nodes in the distributed system. Such multi-homing may reduce the network traffic and/or computer resource burden for a centralized storage point.

In particular embodiments, image layer update data may be retrieved by comparing date or version information associated with the image layer stored at the graph driver with date or version information associated with the image layer stored at a different location. For example, two nodes may compare version or date information associated with a given image layer. Then, if one node has a later or more up-to-date version, the more up-to-date node may provide the update information to the less up-to-date node.

In some embodiments, because the graph driver as a file system is aware of applications as objects, updates can be applied on a data segment level. For instance, if an application image layer includes 1 GB of data but only 1 MB of data that needs to be updated, the graph driver can retrieve the 1 MB of update data rather than retrieving the entire image layer.

At 808, the image layer update data is stored to update the one or more image layers. According to various embodiments, storing the image layer update data may involve communicating with a storage disk such as one of the block devices 134 shown in FIG. 1.

At 810, the database is updated to reflect the updated one or more image layers. In some implementations, updating the database may involve adding or changing a database record to record the updating of the image layer. For instance, the database may be updated to include a new time stamp or checksum (e.g., SHA-1, MD5, etc.) associated with the image layer. The information may be retrieved from a remote location or may be generated dynamically by the graph driver. For instance, the graph driver may dynamically generate a hash value to serve as the checksum and then update the database with the generated value.

Additional features of the graph driver are discussed in greater detail below. In various embodiments, a graph driver is provided for a containerized software system such as Docker and designed to provide a purpose-built container image management file system. An example of such a purpose-built container image management file system is the Layer Cloning File System ("LCFS") provided by Portworx Inc. of Los Altos, Calif., which is capable of saving, starting, and managing Linux container images and may be accessed by a containerized software such as Docker through the FUSE API. In various embodiments, techniques and mechanisms described herein provide any or all of various advantages relative to conventional approaches.

In conventional systems, file systems in containerized software systems often abuse the page cache by loading multiple copies of the same image layers in memory, taking away host memory from running applications. In contrast, techniques and mechanisms described herein avoid creating multiple copies of the same image layers in memory.

In conventional systems, file systems in containerized software systems often exhaust the number of inodes available, thereby causing the underlying filesystems to run out of space. In contrast, techniques and mechanisms described herein avoid inode proliferation by providing read-only access to the same image data and not creating multiple copies of the data when multiple container instances access the same image data.

In conventional systems, file systems in containerized software systems implement a copy-on-write approach, which consumes CPU and takes time during container image management operations. In contrast, techniques and mechanisms described herein store new copies of data only when that data actually differs between different instances.

In conventional systems, file systems in containerized software systems often end up with orphaned layers and cause the operator to resort to resetting the entire containerized software system, usually by deleting all associated data. In contrast, techniques and mechanisms described herein provide for efficient management of application image layers, allowing layers to be deleted when no longer referenced by any application.

In various embodiments, a graph driver may be implemented as a user-level file system written in a language such as C and integrated into operating systems such as Linux and MacOS via a low-level API such as Fuse. Therefore, in some implementations a graph driver may be implemented without requiring any kernel modifications, providing for a portable and/or POSIX-compliant file system.

In particular embodiments, a graph driver may be configured to store ephemeral or temporary data such as application image layer data that may be easily downloaded again from a central repository. Accordingly, a graph driver may be implemented without some of the complexities of a general-purpose file system, such as journaling. Conventional file systems are typically optimized towards persistent data, provide ACID properties (Atomicity, Consistency, Isolation, Durability) for system calls and attempt to work well with random read-write workloads. In contrast, techniques and mechanisms described herein provide for file systems written with container image handling as a specific workload. These operations and efficiency considerations may include, but are not limited to: container image creation, container image cloning and launching of instances, container image memory consumption, number of inodes reported to the kernel by way of multiple copies of the same image (or layers) running, and container image data management (e.g., actions like deletion, forced image removal and local system resource usage based on multiple container images being present.).

Other file systems need to provide ACID properties for every system call. However, according to various embodiments described herein, ACID properties may only be needed when a layer is created, deleted, or persisted. The graph driver hosts the container database with information about various images and containers. It ensures that the database is consistent with the images and therefore that the image data can be read correctly regardless of restarts or crashes. This design in turn avoids having to externally monitor or garbage inspect the data stored in association with the containerized application system.

According to various embodiments, snapshots may be implemented without using any reference counts and thus support a potentially unlimited number of layers. Further, the time used to create a snapshot may be largely or entire independent of factors such as the size of the file system, the number of block devices, the size of the data set, or the number of layers present in the file system. Snapshots may be deleted in the background and processing time may depend on the amount of data actually created/modified in the snapshot. Thus, creation and deletion of layers can be done virtually instantaneously.

In conventional file systems, creating or removing a layer may conflict with operations related to running containers since snapshots are point-in-time images and snapshots may form a chain. In contrast, techniques and mechanisms disclosed herein provide for the creation of a new layer or the deletion of an existing layer without stopping any in-progress operations and without noticeable impact on other running containers. Because the layers on which new layers are created are read-only after they are populated, a new layer will not conflict with any modification operations in progress on the parent layer. Operations within a layer are independent of the total number of layers present in the file system. Each snapshot may be treated as a sibling of the original layer regardless of the number of snapshots.

According to various embodiments, unlike in conventional file systems, layers in a graph driver as disclosed herein are deleted in the reverse order those are created. The newest layer is deleted first, and then the one created just before it. A layer in the middle of chain or the base layer cannot be deleted when there is a newer layer on top of that layer still around. This simplifies the overall snapshot design by avoiding the complexity involved with deleting a snapshot in the middle/beginning of the chain. For example, each layer can easily track space allocated for storing data created/modified by the layer and any such space can be freed without worrying about some other layer sharing any such data. In addition, layers are not rolled back, which avoids some of the complexities of snapshots in a traditional file system. Moreover, by maintaining layers as immutable objects, there is also no need to determine block level differences between layers.

According to various embodiments, when a new device is formatted as a new graph driver file system, a superblock is placed with some file system specific information at the beginning of the device. This information helps to recognize this device to have a valid file system on it anytime it is mounted again in the future. If a device with no valid superblock is mounted as this file system, it is formatted before mounting. Similarly, each of the layers created in the file system also has a private superblock for locating data which belongs exclusively to that layer. Each layer in the file system has a unique index. This index stays the same for the life time of the layer. In addition to the layers created for storing images and containers, a global file system layer keeps data not part of any layers. Superblocks of layers taken on a top of a common layer are linked together. Superblocks of the common layer point to one of those top layer superblocks. Thus, superblocks of all layers taken on top of a layer can be reached from the superblock of that common bottom layer.

In particular embodiments, available space is tracked using a list of free extents. There will be a single such extent immediately after the file system is formatted. The global file system layer tracks the blocks where this list is stored. Similarly, all other layers keep track of extents allocated to those layers. Those blocks are also reachable from the superblock of those layers. In some embodiments, 4 KB is the smallest unit of space allocation or size of I/O to the device, called file system block size. For files larger than 4 KB, multiple such blocks can be allocated in a single operation. Every layer shares the whole device, and space can be allocated for any layer from anywhere in the underlying device.

In some implementations, each file created in any layer has an inode to track information specific to that file such as stat info, dirty data not flushed to disk, etc. Each inode has a unique identifier in the file system called "inode number." Files deleted in a layer do not have to maintain any whiteouts, as their references from the directories are removed in that layer. Inode numbers are not reused even after a file is deleted.

According to various embodiments, the target name for symbolic links is also stored in the same block where inode is written. For directories, separate blocks are allocated for storing directory entries and those blocks are linked together as chain and the chain is linked from the inode. For regular files, additional blocks are allocated for storing data and linked from the inode. When a file becomes fragmented, such as when an entire file cannot be stored contiguously on disk, then additional blocks can be allocated to track file page offsets and corresponding disk locations where data is stored, in extent format. Such blocks, called "emap blocks," are linked from the inode as well. If the file has extended attributes, those can be stored in additional blocks and linked from the inode as well.

According to various embodiments, file handles may be formed by combining the layer index and the inode number of the file. This is a 64-bit number and is returned to FUSE when files are opened/created. This file handle can be used to locate the same file in subsequent operations like read, readdir, write, truncate, flush, release, etc. The file handle for a shared file, when accessed from different layers, would be different as the layer index part of the file handle would be different. This may be a problem when same file is read from different layers as multiple copies of data may end up in the kernel page cache. To alleviate this problem, pages of a shared file in kernel page cache are invalidated on last close of a shared file or when a file is closed in the operating system.

In various embodiments, each layer has a read-write lock, which is taken in shared mode while reading/writing to the layer (all file operations). This lock is taken in exclusive mode while unmounting the root layer or while deleting any other layer. Moreover, each inode has a read-write lock. Operations which can be run in shared mode (read, readdir, getattr, etc.), take that lock in shared mode, while other operations which modify the inode hold that lock in exclusive mode. This lock is not taken once a layer is frozen (meaning, a new layer is created on top of that layer and no more changes are allowed in the layer).

In some implementations, new layers are added after locking the parent layer in shared mode, if there is a parent layer. The newly created layer can be linked to the parent layer. All the layers taken on a parent layer are linked together as well. A layer with no parent layer forms a base layer. The base layer for any layer can be reached by traversing the parent layers starting from that layer. Layers with same base layer form a "tree of layers". A layer is removed after locking that layer in exclusive mode. That makes sure all operations on that layer are drained. Also shared locks on the base layer are held during that operation. The root layer is locked in shared mode while creating/deleting layers and locked exclusive while unmounting the file system.

According to various embodiments, each layer will allocate space in chunks of a few blocks and then files within that layer will consume space from those chunks. This approach eliminates many of the complexities associated with space management in traditional file systems. The global pool does not have to be locked down for various allocations happening concurrently across various layers in the file system. Another advantage of this approach space allocated in layers is less likely to be fragmented. Every layer keeps track of space allocated within that layer and all that space can be returned to the global pool when the layer is deleted. Unused space in reserved chunks can be returned as well as part of layer deletion, sync, and unmount.

According to various embodiments, writes are returned immediately after copying new data to inode page table. Zero blocks written to files are detected. If all data written to a file is zeros, then nothing is written to disk and such files do not consume any disk space. If pages of a file with non-zero data are overwritten with zeroes, then corresponding blocks are freed from the file. Sparse files are supported and files do not consume space on disk for sparse regions. Writes which are not page aligned do not trigger reading at the time of write, but deferred until application reads the page again or when the page is written to disk. If the page is filled up with subsequent writes, reading of the page from disk can be completely avoided as a whole page can be written down.

According to various embodiments, space for files is not allocated when data is written to the file, but later when dirty data is flushed to disk. Accordingly, the size of the file is known at the time of space allocation and all the blocks needed for the file can be allocated as single extent if the file system is not fragmented. With the read-only layers created while populating images, files are written once and never modified. This scheme of deferred allocation helps keeping the files contiguous on disk. Also temporary files may never get written to disk because they are not persisted. For instance, large temporary files may be created for image tar files. This scheme of deferred allocation also helps to conserve computing resources when an application writes to a file randomly and/or when writes are not page aligned. In addition, when writes received on a file are all zeroes, those zeroes need not be written to disk and therefore need not consume any space on disk. Such a scheme also conserves computing resources when writing out small files by coalescing many of them together and writing their pages to disk in large chunks Similarly, metadata blocks like inode blocks and directory blocks may be placed contiguously and written out together. The attempt to place files contiguously on disk may provide benefits in terms of consuming less memory (e.g., less metadata), less disk space, and less overhead. When space for a file is allocated contiguously as part of flush, the dirty pages of the file can be flushed in large chunks reducing the number of I/Os issued to the device.

If the graph driver is not shutdown normally, the container database and layers in the graph driver need to be consistent, and each layer needs to be consistent as well. According to various embodiments, because the graph driver manages both the container database and the images/container data, those are kept in consistent state by using checkpointing technologies. Thus the file system described herein can avoid the complexity of journaling schemes used in conventional file systems to provide crash consistency.

According to various embodiments, finding differences between any two layers may involve finding inodes present in layers between the old layer and new layer (inclusive). When enabled at build time, file operations and ioctl requests may be counted and times taken for each of those are tracked for each layer separately. Those stats can be queried using a command. In some embodiments, such stats can also displayed at the time a layer is unmounted. Stats for a layer can be cleared before running applications to trace actual operations during any time period. Memory usage on a per layer basis can be tracked and reported as well. Similarly, count of files of different types in every layer is maintained. Also, counts of I/Os issued by each layer can tracked.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
at a graph driver on a local server:
receiving, via a processor on the local server, a request to store a designated application image layer in a containerized application system, the containerized application system configured to run a plurality of distributed application instances within an operating system executed on a host system, each application instance corresponding with a designated application, each application including one or more application image layers, the one or more application image layers including the designated application image layer;
retrieving application image layer data associated with the application image layer from a remote host via a network interface for storage on a designated storage device; and
recording the retrieved application image layer data as stored in a file system associated with the storage device after the application image layer data is stored on the designated storage device such that the graph driver is aware of different application image layers as a unit of granularity,
wherein the graph driver is configured to selectively update portions of the individual image layers without needing to download entire application images or entire application image layers.

2. The method recited in claim 1, the method further comprising:
identifying a performance characteristic associated with the application image layer.

3. The method recited in claim 2, wherein the local server includes a plurality of storage devices including the designated storage device, and wherein the designated storage device is selected for storing the application image layer data based on the identified performance characteristic.

4. The method recited in claim 1, wherein the request to store the designated application image layer is generated in response to a request to update the designated application image layer.

5. The method recited in claim 4, wherein the application image layer data includes application image layer difference data that represents a difference between an original version of the application image layer and an updated version of the application image layer.

6. The method recited in claim 1, the method further comprising:
storing the application image layer data on the designated storage device.

7. The method recited in claim 1, wherein each application instance is associated with respective persistent data and respective instance data, the respective persistent data being shared across a plurality of application instances and being read-only, the respective instance data being specific to the respective application.

8. A system comprising:
a processor configured to receive a request to store a designated application image layer in a containerized application system, the containerized application system configured to run a plurality of distributed application instances within an operating system executed on a host system, each application instance corresponding with a designated application, each application including one or more application image layers, the one or more application image layers including the designated application image layer;
a network interface configured to retrieve application image layer data associated with the application image layer from a remote host via a network;
a graph driver, the graph driver configured to selectively update portions of the individual image layers without needing to download entire application images or entire application image layers; and a designated storage device configured to store the application image layer data, wherein the retrieved application image layer data as stored is recorded in a file system associated with the storage device after the application image layer data is stored on the designated storage device such that the graph driver is aware of different application image layers as a unit of granularity.

9. The system recited in claim 8, wherein the processor is further configured to identify a performance characteristic associated with the application image layer.

10. The system recited in claim 9, wherein the system includes a plurality of storage devices including the designated storage device, and wherein the designated storage device is selected for storing the application image layer data based on the identified performance characteristic.

11. The system recited in claim 8, wherein the request to store the designated application image layer is generated in response to a request to update the designated application image layer.

12. The system recited in claim 11, wherein the application image layer data includes application image layer difference data that represents a difference between an original version of the application image layer and an updated version of the application image layer.

13. The system recited in claim 12, wherein the processor is further configured to store the application image layer data on the designated storage device.

14. The system recited in claim 8, wherein each application instance is associated with respective persistent data and respective instance data, the respective persistent data being shared across a plurality of application instances and being read-only, the respective instance data being specific to the respective application.

15. One or more non-transitory computer readable media having instructions stored thereon for performing a method, the method comprising:
at a graph driver on a local server:
receiving, via a processor on the local server, a request to store a designated application image layer in a containerized application system, the containerized application system configured to run a plurality of distributed application instances within an operating system executed on a host system, each application instance corresponding with a designated application, each application including one or more application image layers, the one or more application image layers including the designated application image layer;
retrieving application image layer data associated with the application image layer from a remote host via a network interface for storage on a designated storage device; and
recording the retrieved application image layer data as stored in a file system associated with the storage device after the application image layer data is stored on the designated storage device such that the graph driver is aware of different application image layers as a unit of granularity,
wherein the graph driver is configured to selectively update portions of the individual image layers without needing to download entire application images or entire application image layers.

16. The one or more non-transitory computer readable media recited in claim 15, the method further comprising:
identified a performance characteristic associated with the application image layer.

17. The one or more non-transitory computer readable media recited in claim 16, wherein the local server includes a plurality of storage devices including the designated storage device, and wherein the designated storage device is selected for storing the application image layer data based on the identified performance characteristic.

18. The one or more non-transitory computer readable media recited in claim 15, wherein the request to store the designated application image layer is generated in response to a request to update the designated application image layer.

19. The one or more non-transitory computer readable media recited in claim 18, wherein the application image layer data includes application image layer difference data that represents a difference between an original version of the application image layer and an updated version of the application image layer.

20. The one or more non-transitory computer readable media recited in claim 15, the method further comprising:
storing the application image layer data on the designated storage device.

* * * * *